Oct. 18, 1932.          J. H. REICHART                1,882,901
                      PORTABLE ELECTRIC GRILL
                       Filed Feb. 15, 1930
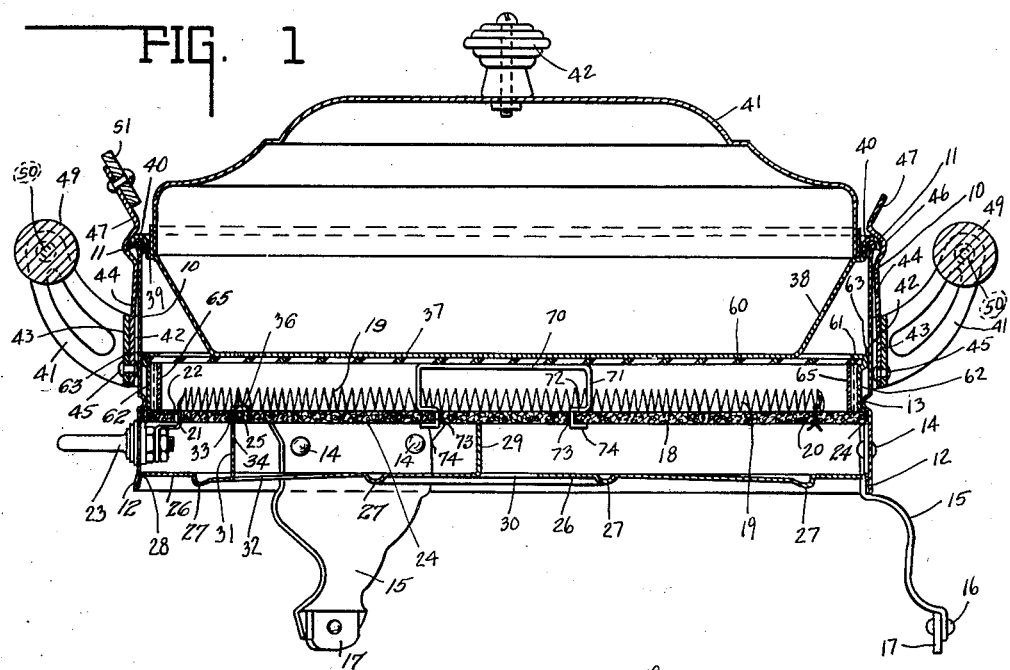
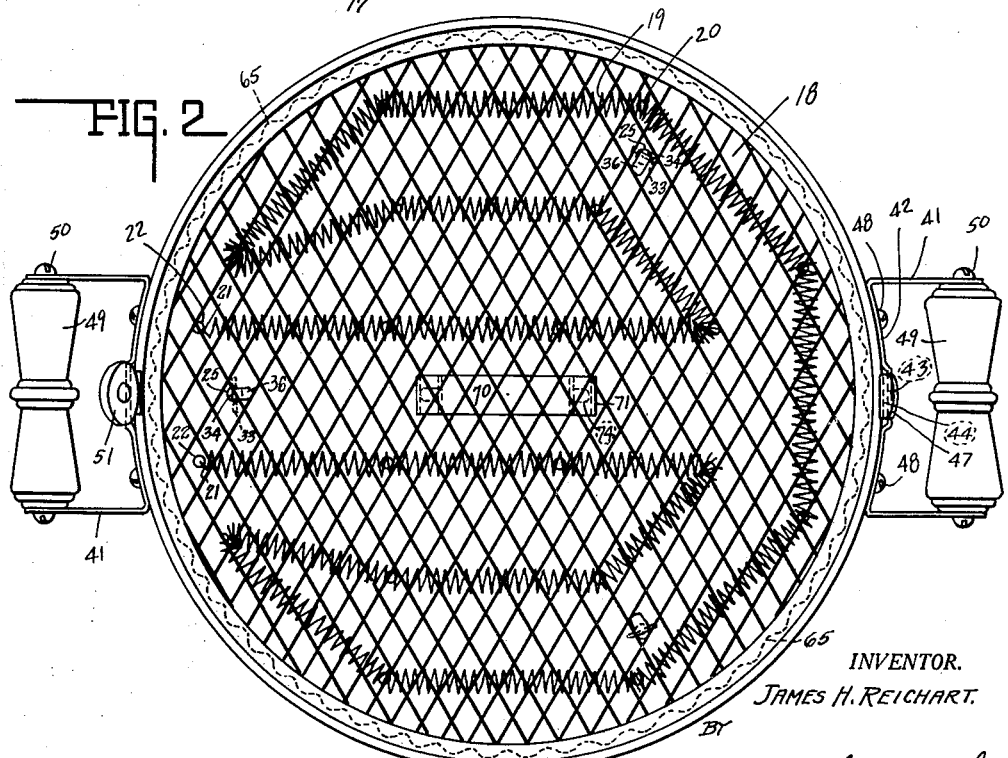
INVENTOR.
JAMES H. REICHART.
BY
Lockwood, Lockwood, Goldsmith & Galt
ATTORNEYS.

Patented Oct. 18, 1932

1,882,901

UNITED STATES PATENT OFFICE

JAMES H. REICHART, OF MUNCIE, INDIANA

PORTABLE ELECTRIC GRILL

Application filed February 15, 1930. Serial No. 428,556.

This invention relates to a portable electric grill although certain features of the construction are readily applicable to so-called semi-fireless cookers and electric corn poppers.

The chief object of the invention is to simplify the construction of a portable grill.

Another object of the invention is to construct the grill such that it is adaptable for broiling, heating and frying.

The chief feature of the invention consists in the arrangement of the grill construction such that a cooking pan is detachably supported thereby, the latter being fashioned to support an appropriate cover when desired and the heating construction being so arranged and protected that when the cover and pan are removed the grill is adaptable for direct broiling action or when desired a smaller vessel may be supported within the confines of the grill and be heated by the electrical element thereof.

Another feature of the invention consists in the combination handle and cooking pan retainer construction.

The full nature of the invention will be understood from the accompanying drawing and the following description and claims:

In the drawing Fig. 1 is a central sectional view through the grill embodying the invention. Fig. 2 is a top plan view of the same with the cover and cooking pan removed.

In the drawing 10 indicates a peripheral side wall which at its upper end is provided with a curled or beaded portion 11 forming a protecting edge and its lower edge is similarly provided as at 12. Intermediate the ends there is provided a peripheral bead portion 13 which serves as a stop.

Suitably secured as at 14 are a plurality of legs 15 each of which supports at its lower portion as at 16 an insulated foot 17. This may be of fiber or rubber. The several legs have an appropriate outline so that two legs may be formed by a single common cutting from a strap having the width necessary to form a leg of the appropriate depth. The strap is of any desired length and the legs are cut out in alternated form therefrom with a minimum of wastage.

Abutting the lower edge of the peripheral beaded portion 13 and included within the peripheral side wall 10 is an insulation plate 18 which supports a heating element 19 suitably distributed about the surface thereof and secured thereto in predetermined relation by any suitable anchorage as a plurality of the eyeleted clips 20. The ends 21 of the heating element are brought down through openings 22 in the insulation plate and are suitably secured to a terminal construction 23 supported by the casing.

The insulation plate is maintained in predetermined position within the peripheral side wall 10 by abutting the bead 13. Dropping out of the plate is prevented by the same resting upon the top or edge portion 24 of the legs. The insulation plate is thus clampingly secured in predetermined position.

The insulation plate is suitably apertured as at 25. A bottom protective cover plate 26 having a plurality of annularly corrugated portions 27 is frictionally received within the open lower end of the side wall and the edge 28 of said plate seats upon the beaded portion 12 of the side wall. The plate 26 has a spacing tongue 29 struck therefrom as at 30 and extends upwardly and bears against the central portion of the insulation plate. At suitable intervals about the periphery, and herein three are illustrated, tongues 31 are struck as at 32 from said plate and each tongue includes a shoulder 33 and a upward extension 34 which passes through the opening 25 and is turned angularly as at 36 for clampingly mounting the plate 26 upon the insulation plate. The plate 26 serves as a protective plate for the insulation plate. It also serves as a heat protective device for the support engaged by the legs.

A cooking and heating pan having a bottom 37 includes an upwardly and outwardly inclined side wall 38 which, near its outer edge, is provided with a peripheral seat 39 and an upwardly and outwardly and then downwardly curved groove-forming portion 40. The latter seats upon the upper beaded edge 11 of the side wall and overlaps the same. A cover 41, having the handle portion 42, is arranged to engage upon the seat 39 and form a closed heating chamber with the pan.

The handle construction includes a plurality of U-shaped clips having the free ends 41 which extend upwardly from the midportion 42. The central portion of the midportion is offset outwardly as at 43 and a pan retaining clip 44 is suitably anchored thereto as at 45. The upper end of the clip 44 terminates adjacent the peripheral side wall bead 11 in a curved portion 46 and an outwardly directed end 47. Each U-shaped clip 41—42 is suitably secured as at 48 to the side wall. Mounted between the outer free ends 41 is a hand-engageable portion 49 secured thereto by screws 50 or the like. One of the clips 44 has the end 47 extended and the same supports a heat and electric insulation member 51. Pressure exerted outwardly and downwardly upon member 51 permits the release of the pan portion 40 from that clip and the formation of the opposite clip is such that the pan may be readily removed from the side wall to which it heretofore has been detachably locked thereto by said clips 44.

When the cover 41 is not employed, the grill construction is adaptable for heating purposes and particularly frying pan use. Upon completion of frying or the like, the pan may be readily removed and since it is sheet steel may be readily cleaned without in any way subjecting the heating element to the danger of short circuiting through the use of water and the like. When a covered vessel or cooking implement is desired, cover 41 in combination with the heating pan 37 is satisfactory.

When direct broiling action is desired or when a smaller vessel is to be heated, instead of heating the same upon the heating pan, quicker and more effective results can and will be obtained if the cover and pan are removed and the vessel directly exposed to the heating element. To protect said heating element from mechanical injury when the pan is removed, a guard construction is provided and the same herein is shown comprising a slitted sheet known as expanded "metal" 60 which has its peripheral edge substantially conforming to the outline of the side wall and which is clampingly associated with the grooved portion 61 of an annular spacing member 62. The spacing member 62 is frictionally retained within the side wall by the outer portion 63 of the groove portion 61 directly engaging the side wall 10 and the peripheral portion 62 at its lower edge engaging the inner surface of the bead 13. To positively prevent pulling out of the expanded metal protector and vessel support should it become heated and flex downwardly, the annularly arranged corrugated strip 65 is positioned in clase proximity to the portion 62 and its upper edge supports the expanded metal grid and its lower edge bears upon the insulation plate.

To further support the grid and particularly the midportion and maintain the same in predetermined spaced relation, a metallic U-shaped member has its upper end midportion 70 positioned immediately beneath the grid and the latter bears thereon. The arms 71 are offset inwardly as at 72 and each passes through an aperture 73 and the free end is turned angularly as at 74 so as to lie upon the opposite face of the insulation plate. Thus, the central supporting clip 70—71 is anchored to the insulation plate.

The invention claimed is:

1. In a grill, the combination of a peripheral side wall, an electric heating element construction nested therein, a cooking pan having a base portion positionable adjacent the construction and a peripheral portion overlapping the upper edge of said side wall, a plurality of handle constructions each secured to the side wall, and an upwardly extending pan anchoring clip supported by each handle construction for detachably securing said pan to said side wall.

2. In a grill, the combination of a peripheral side wall, an electric heating element construction nested therein, a cooking pan having a base portion positionable adjacent the construction and a peripheral portion overlapping the upper edge of said side wall, a plurality of U-shaped members each secured at its mid-portion to the side wall, the free ends thereof extending outwardly from said side wall, a hand engageable member for each U-shaped member supported at opposite ends by and positioned between the ends of said U-shaped member, and an upwardly extending pan anchoring clip supported by each U-shaped member for detachably securing said pan to the side wall.

3. In a grill, the combination of a peripheral side wall, an electric heating element construction nested therein, a removable pan supported by said wall and having a heating portion positioned adjacent said heating element construction and detachably mounted upon said side wall, an openwork grid supported above said heating element construction for protecting the same, and means supporting said grid in spaced relation to said heating element construction comprising a peripherally arranged corrugated spacing member, the upper edge of which supports the grid and the lower end of which engages said heating element construction.

4. In a grill, the combination of a peripheral side wall, an electric heating element construction nested therein, a removable pan supported by said wall and having a heating portion positioned adjacent said heating element construction and detachably mounted upon said side wall, an openwork grid supported above said heating element construction for protecting the same, means supporting said grid in spaced relation to said heating element construction comprising a peripherally arranged corrugated spacing member, the upper edge of which supports the grid and the lower end of which engages said heating element construction, and a central support secured to the heating element construction and terminating adjacent the grid for supporting the central portion thereof and maintaining the same in predetermined spaced relation to said heating element construction.

5. In a grill, the combination of a peripheral side wall, a support member extending from side to side, a heating element construction including an insulation plate and extending from side to side and supporting thereon an electric heating coil and in spaced relation to the support member, said side wall including peripheral beading engageable by the insulation plate, and a leg construction secured to said side wall and terminating adjacent the insulation plate and cooperating with said beading for predetermined positioning of the insulation plate.

In witness whereof, I have hereunto affixed my signature.

JAMES H. REICHART.